(12) United States Patent
Kozhukh

(10) Patent No.: US 6,437,903 B1
(45) Date of Patent: Aug. 20, 2002

(54) LIGHT MODULATOR WITH TWO MIRROR SETS

(75) Inventor: Michael Kozhukh, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/081,611

(22) Filed: Feb. 20, 2002

(51) Int. Cl.[7] .................. G02B 26/00; G02B 26/08; G02F 1/00
(52) U.S. Cl. .................. 359/291; 359/290; 359/214; 359/224; 359/230; 359/871; 348/771; 427/534
(58) Field of Search .................. 359/290, 291, 359/214, 224, 230, 871, 846, 295; 348/771, 770; 427/534, 162, 255.6

(56) References Cited

U.S. PATENT DOCUMENTS

| | | | | |
|---|---|---|---|---|
| 3,886,310 A | * | 5/1975 | Guldberg et al. | 348/771 |
| 5,212,582 A | * | 5/1993 | Nelson | 359/224 |
| 5,650,881 A | * | 7/1997 | Hornbeck | 359/871 |
| 5,661,591 A | * | 8/1997 | Lin et al. | 359/290 |
| 5,719,695 A | * | 2/1998 | Heimbuch | 359/291 |
| 5,953,153 A | * | 9/1999 | Conner et al. | 359/290 |
| 6,271,955 B1 | * | 8/2001 | Atobe et al. | 359/291 |

* cited by examiner

Primary Examiner—Loha Ben
(74) Attorney, Agent, or Firm—Trop, Pruner & Hu, P.C.

(57) ABSTRACT

Manufacture a spatial light modulator by fabricating a first set of micro-mirrors, then subsequently fabricating a second set of micro-mirrors interspersed with the first set, to reduce space between adjacent micro-mirrors versus what could be done by simultaneously fabricating all the micro-mirrors as one set.

42 Claims, 6 Drawing Sheets

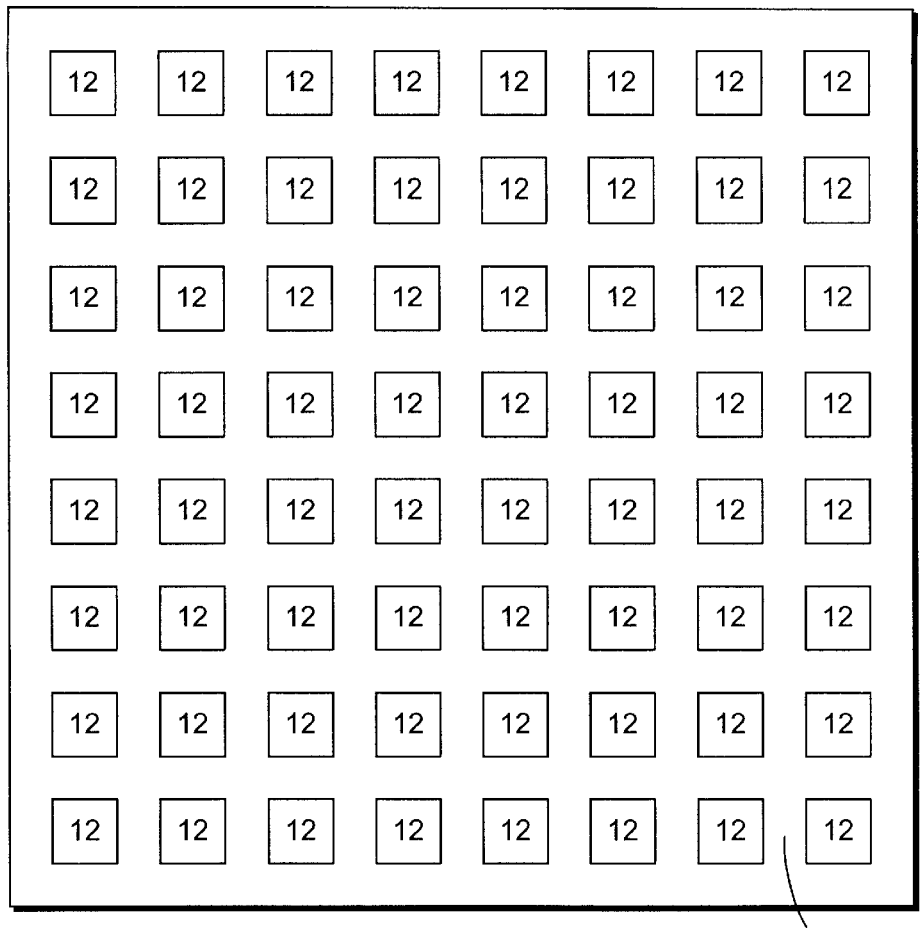
Fig. 1 - prior art
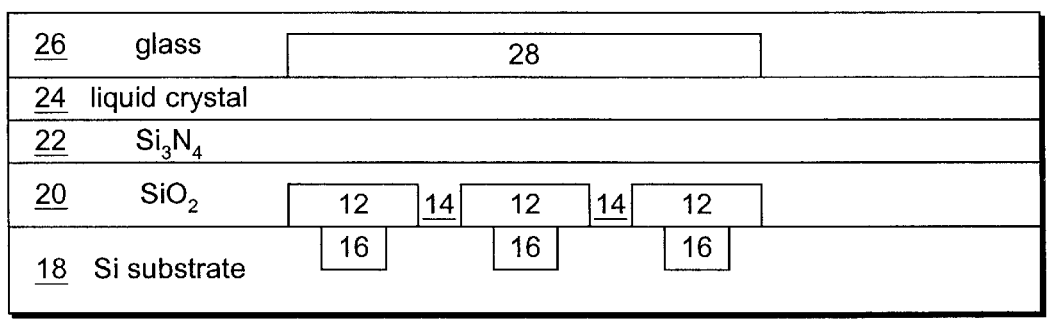
Fig. 2 - prior art

30 ⬈   Fig. 11   46

LIGHT MODULATOR WITH TWO MIRROR SETS

BACKGROUND OF THE INVENTION

1. Technical Field of the Invention

The present invention relates generally to spatial light modulators, and more particularly to a spatial light modulator having its array of micro-mirrors manufactured in two sets.

2. Background Art

FIG. 1 illustrates a top view of a simplified spatial light modulator (SLM) 10 such as is known in the art. The SLM includes an array of reflective micro-mirrors 12 each of which constitutes an electrode of a respective display pixel. The other electrode of the display pixels is formed as a transparent electrode layer (not shown, on top of an area of liquid crystal (not shown).

Due to limitations in existing fabrication techniques, the array of micro-mirrors is arranged such that there is a space or gap 14 between adjacent micro-mirrors. Currently, this space accounts for upward of 10% of the surface area of the pixel array. This means that upward of 10% of the light striking the array is lost, and is not reflected back through the liquid crystal. This lost light is actually of absorbed by the SLM, causing heating and other problems. Furthermore, the spacing places limitations on the scalability of the micro-mirror array, making it increasingly difficult to effectively decrease the micro-mirror size and increase the resolution of the device.

FIG. 2 illustrates a cross-sectional view of a portion of the SLM 10. The device is built upon a substrate 18, such as silicon. Conductive vias 16 or other interconnecting structures are built into the substrate. The micro-mirrors 12 are fabricated in electrical contact with the vias, with spacing 14 between adjacent neighbors. The micro-mirrors are encased in one or more insulative, antireflective layers. These layers can include a first layer 20, such as $SiO_2$, and a second layer 22, such as $Si_3N_4$, which is fabricated over the first layer. A layer of liquid crystal material 24 is sandwiched between these layers and a glass layer 26 which holds the transparent electrode layer 28. When an electrical potential is applied between a micro-mirror and the transparent electrode layer, the region of liquid crystal between them becomes transparent. The degree of transparency can be adjusted, such as by altering the electrical potential or by phase width modulating its signal, to give plural levels of transparency, and thus plural levels of reflected light. A typical SLM offers 256 levels of color resolution.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

FIG. 1 shows a top view of a spatial light modulator having an array of micro-mirrors, spaced apart as dictated by manufacturing technology limitations of the prior art.

FIG. 2 shows a cross-section view of the spatial light modulator of FIG. 1.

DETAILED DESCRIPTION

FIGS. 3–10 illustrate one exemplary embodiment of a method of fabricating a spatial light modulator (SLM) 30 so as to overcome spatial limitations of the prior art. The reader will appreciate that FIGS. 3–10 have been greatly simplified, such as by showing a greatly reduced number of components.

Figure 3:
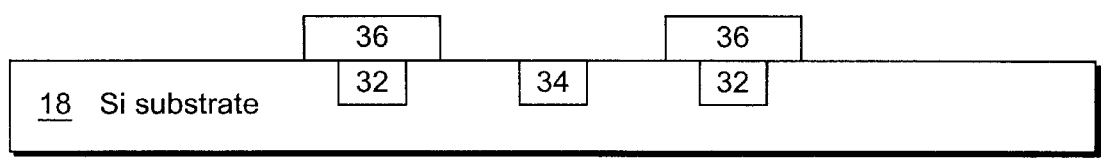
FIGS. 3–10 show a manufacturing sequence of the invention.

FIG. 3 shows the substrate 18 upon which the SLM is based. The substrate may be silicon, gallium arsenide, or other suitable material. The substrate is equipped with vias 32, 34 or other suitable electrical connections to the memory (not shown) built into the semiconductor substrate. These may be logically divided into a first set of connections 32, and a second set of connections 34, which are interspersed. A first set of micro-mirrors 36 are fabricated in electrical contact with respective ones of the first set of connections 32. The second set of connections 34 is left unconnected at this point. In one embodiment, the first micro-mirrors may be constructed of aluminum having a thickness of roughly 1,500 Å. In other embodiments, the aluminum may be 1,000 Å thick, or up to 20,000 Å thick.

Figure 4:
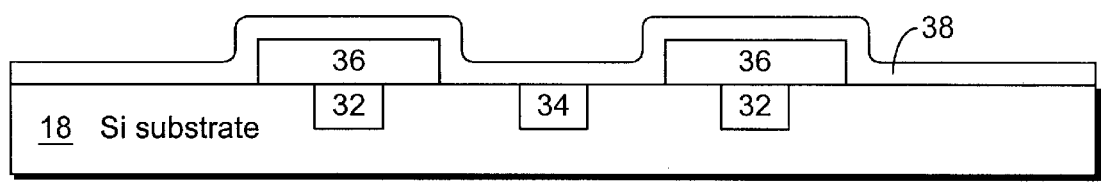

FIG. 4 shows an insulative, antireflective layer 38 such as $SiO_2$ which is formed over the first set of contacts and the exposed substrate. In one embodiment, the insulative, antireflective layer 38 can be 250 Å thick.

Figure 5:
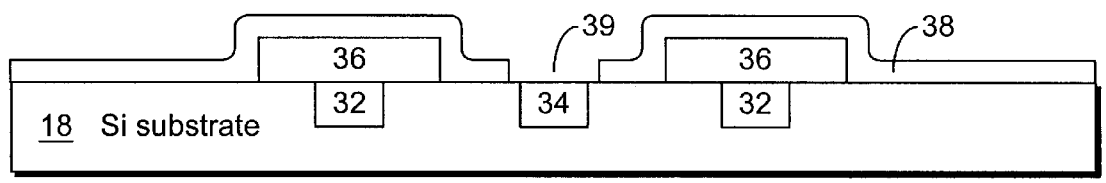

FIG. 5 shows a hole 39 which has been etched or otherwise formed through the insulative layer to expose one of the second set of connections 34. In one embodiment, the hole comprises approximately 1% of the area of the micro-mirror to be connected through it. In various other embodiments, the hole may be the same size as the underlying via, or somewhat smaller, or somewhat larger, depending upon the particulars of the fabrication process, the application, and so forth.

Figure 6:
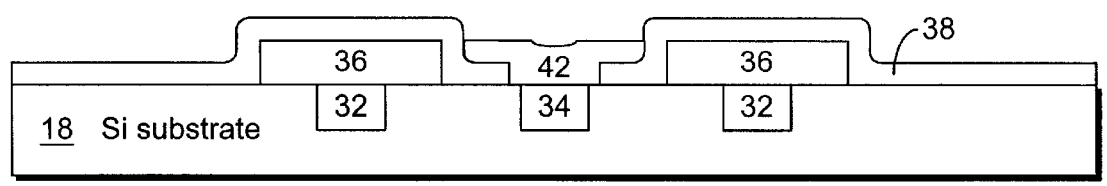

FIG. 6 shows the formation of a micro-mirror 42 of the second set, in electrical contact with its corresponding member of the second set of connections 34. In one embodiment, the second micro-mirrors can be fabricated from aluminum having a thickness of roughly 1,250 Å as measured from the top of layer 38. In some embodiments, the thickness of the second micro-mirrors differs from that of the first micro-mirrors by the thickness of the insulative layer 38, so the surfaces of the first and second micro-mirrors are substantially coplanar.

The first and second micro-mirrors may be fabricated of any suitably reflective and conductive material. Typically, this will be a metal, such as aluminum, silver, or the like.

Figure 7:
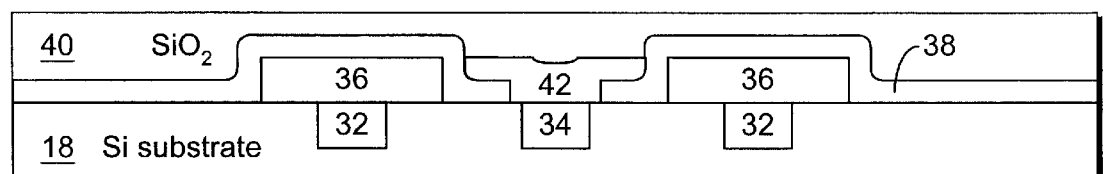

FIG. 7 shows the formation of an additional insulative, antireflective layer 40, which insulates the second set of micro-mirrors. In one embodiment, this additional insulative layer can be roughly 2,000 Å thick, then, by chemical mechanical polishing, decreased down to a thickness of about 750 Å, which will also planarize the surface, as shown. The reader will appreciate that, in some embodiments where the first insulative layer 38 and the second insulative layer 40 are fabricated of sufficiently similar materials, they may effectively blend into a single insulative layer; thus, in FIGS. 8–10, the first insulative layer 38 is no longer shown.

Figure 8:
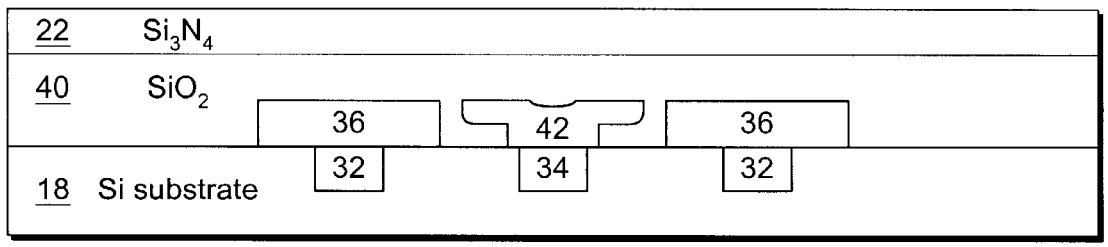

FIG. 8 shows the formation of a second insulative, antireflective layer 22 such as $Si_3N_4$ or other suitable material. In some embodiments, this layer, or perhaps other layers, may be omitted. In one embodiment, both antireflective layers can be roughly 750 Å thick.

Figure 9:
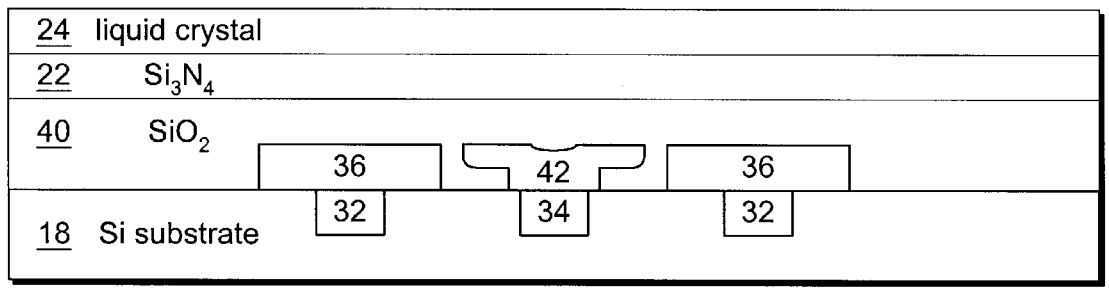

FIG. 9 shows the addition of a layer of liquid crystal material 24.

Figure 10:
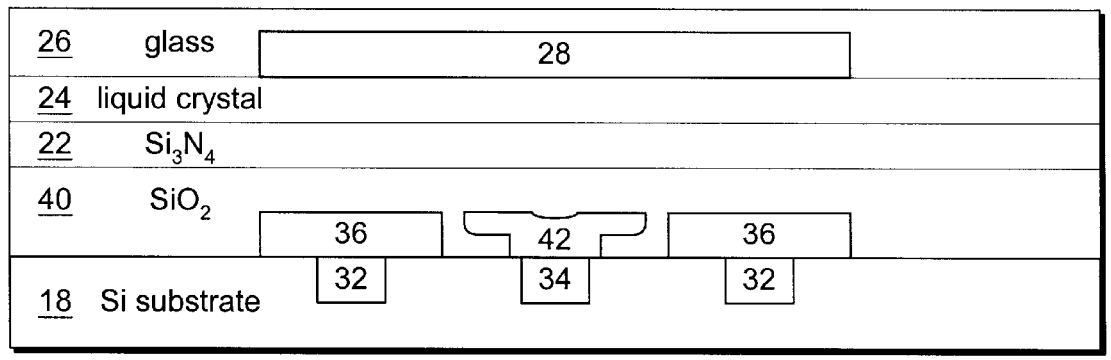

FIG. 10 shows the addition of glass 24, with a film or layer of conductive electrode 44.

Figure 11:
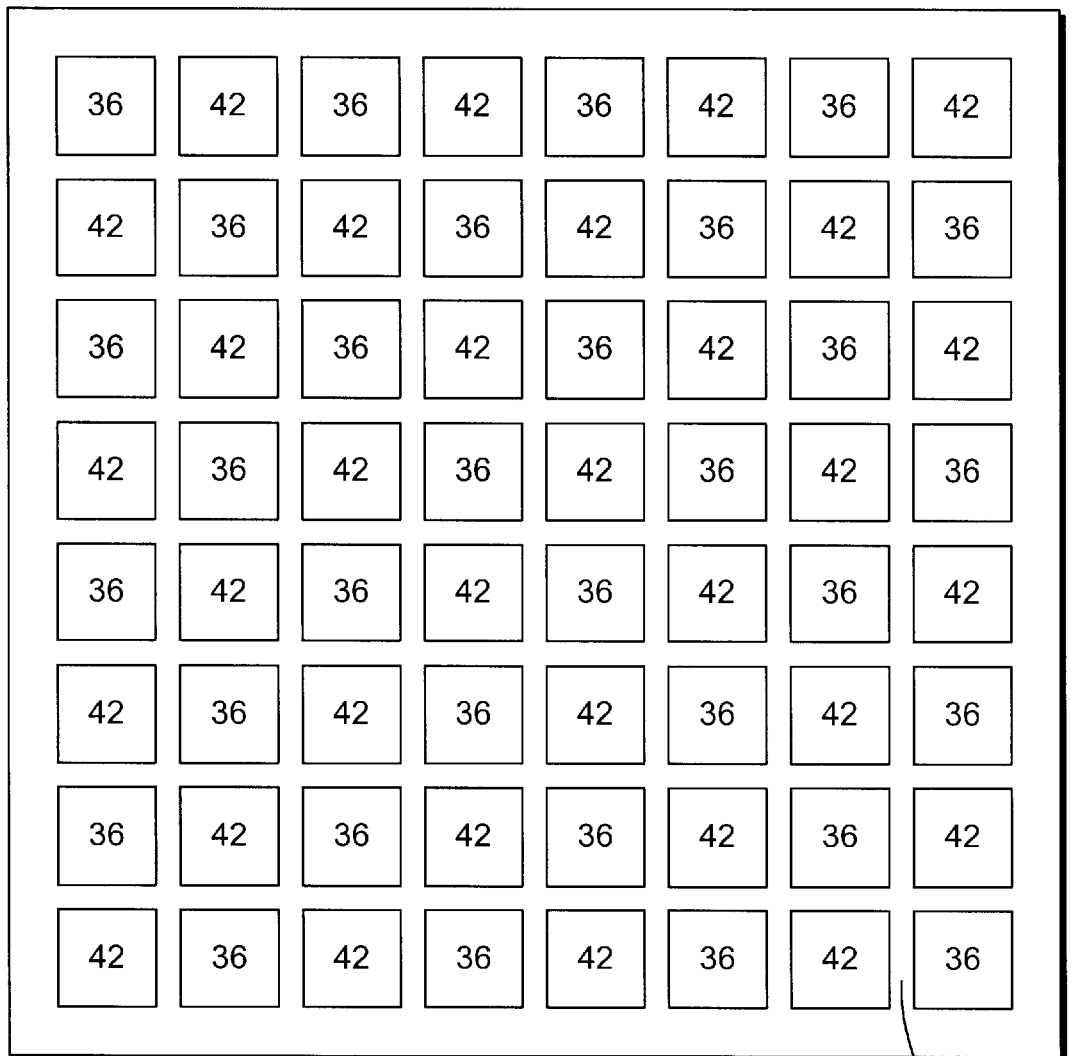
FIG. 11 shows a top view of a spatial light modulator built according to the invention.

FIG. 11 is a top view of the SLM 30 built according to this invention, in which the spacing 46 between adjacent micro-mirrors is substantially reduced from that (14) of the prior art. In one embodiment, the micro-mirrors are interspersed in a checkerboard pattern, as shown. Other patterns may, of course, be practicable given the teachings of this disclosure.

The reader will appreciate that the insulative layer 38 can be very thin, such as 250 Å, and that this is a much smaller spacing than the smallest spacing (14 in FIGS. 1 and 2) which lithography techniques permit between the simultaneously-fabricated single set of micro-mirrors (12 in FIGS. 1 and 2) in the prior art. Thus, by fabricating adjacent micro-mirrors separately, the invention permits tighter spacing of the micro-mirrors.

Figure 12:
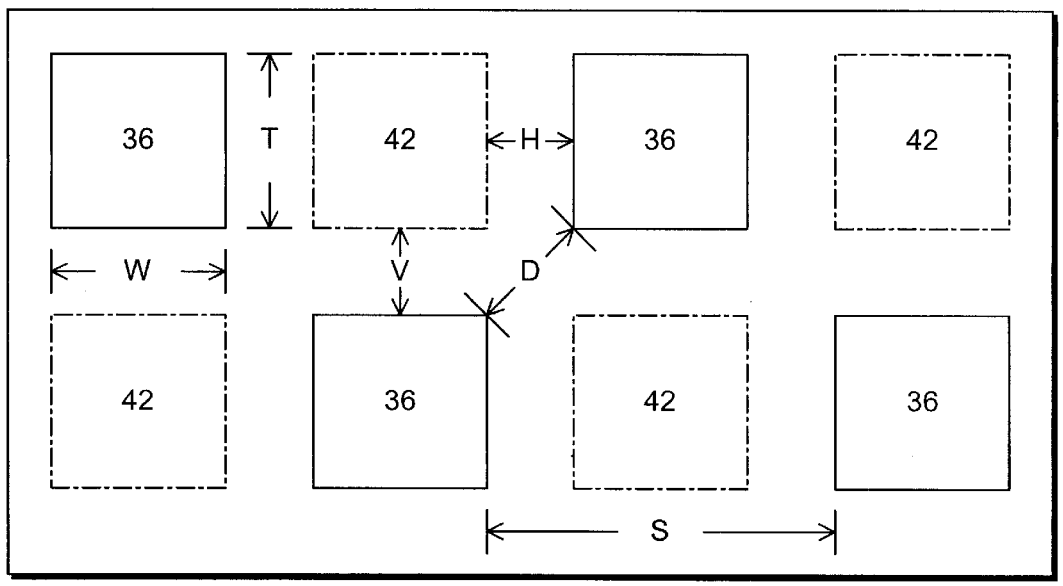
FIG. 12 shows a detailed, close-up, top view of micro-mirrors in the array built according to the invention.

FIG. 12 illustrates this principle in further detail. For ease of visualization, the first set of micro-mirrors 36 are shown in solid lines, while the second set of micro-mirrors 42 are shown in dashed lines. In one embodiment, the micro-mirrors are substantially square or rectangular, having a width W and a height T, with a horizontal distance H or a vertical distance V between adjacent neighbors. The horizontal and vertical directions may collectively be termed lateral directions. By fabricating the micro-mirrors as two checkerboarded sets, the distance S between adjacent neighbors within in the same set is dramatically larger than the distance H or V which would apply if the micro-mirrors were fabricated as a single set. (The vertical distance between adjacent neighbors in one of the two sets, corresponding generally to S, is not shown, in the interest of simplicity.)

In some embodiments, it may be found that the diagonal distance D between diagonal neighbors in the same set of two sets can become the limiting factor in determining how closely the micro-mirrors can be spaced within the same set.

Figure 13:
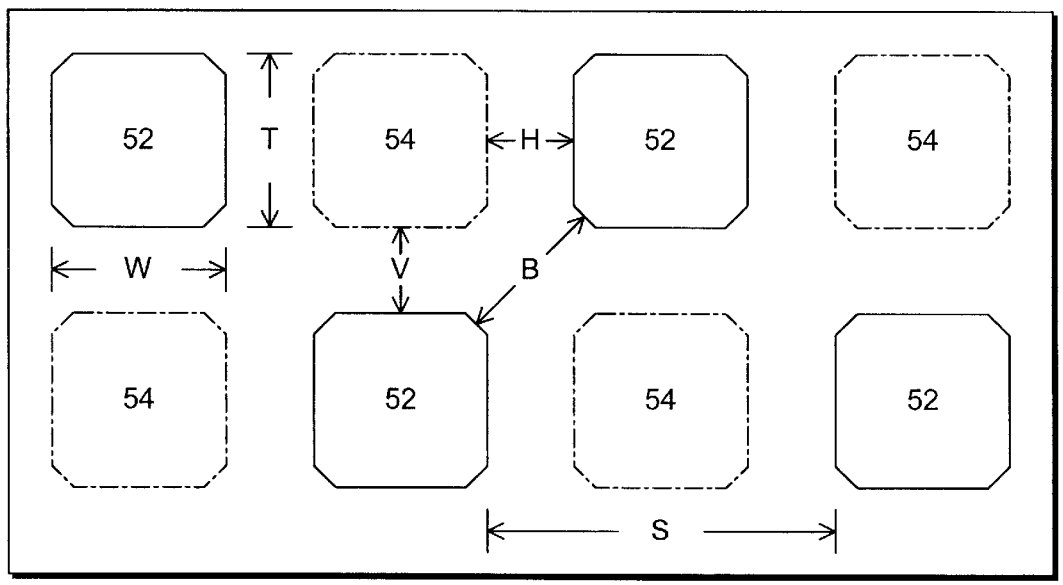
FIG. 13 shows a top view of an alternative embodiment of the array of micro-mirrors.

FIG. 13 illustrates one embodiment of a solution to this problem. By altering the shape of the micro-mirrors, the diagonal distance B can be made substantially greater than the distance D (of FIG. 12). One suitable alternative shape is an eight-sided, nearly square shape, with the corners slightly relieved, as shown.

The reader will appreciate that the grid need not be regular nor rectangular, and that the micro-mirrors can be of any suitable shape, spacing, and gridding. For example, hexagonal pixels in a honeycomb grid could be a desirable solution in some applications.

Figure 14:
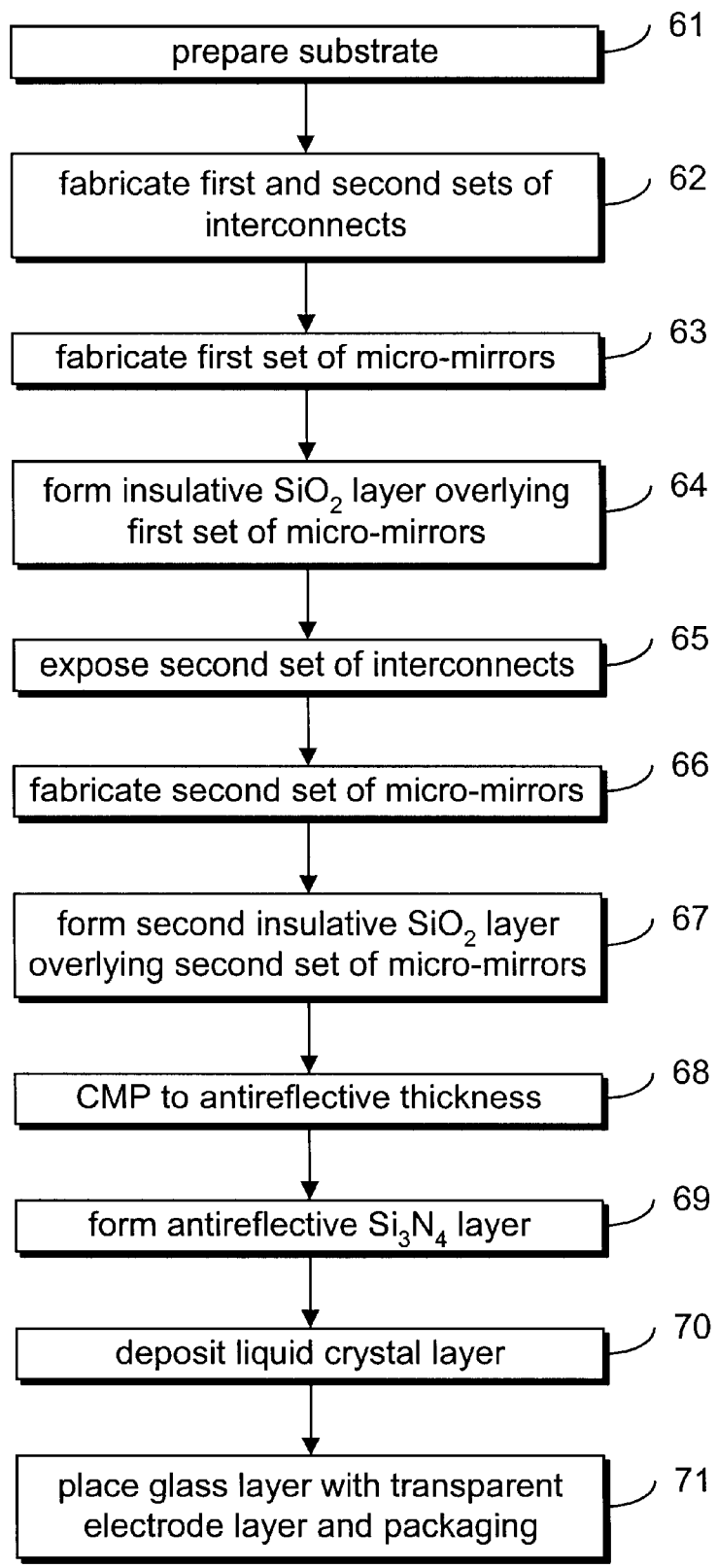
FIG. 14 shows one embodiment of a method of fabrication of the spatial light modulator.

FIG. 14 illustrates one exemplary embodiment of a method 60 of manufacturing the SLM of this invention. After the substrate is properly prepared (61), the first and second sets of vias or interconnects are fabricated (62). Then the first set of micro-mirrors is fabricated (63), and an insulative layer of $SiO_2$ may be formed (64) overlying the first set of micro-mirrors. The second set of vias or interconnects is exposed (65) such as by etching holes through the insulative layer. The second set of micro-mirrors is fabricated (66), and another insulative $SiO_2$ layer may be formed (67) overlying the second set of micro-mirrors. The insulative layers may blend into a single insulative layer, as previously mentioned. The insulative layer is CMP polished (68) down to a predetermined thickness suitable to make the layer antireflective. Another antireflective layer $Si_3N_4$ may be formed (69) overlying this $SiO_2$ layer. A layer of liquid crystal material is deposited (70) over the whole array, and the entire structure is overlayed (71) with a layer of glass or other suitable material, in which the transparent electrode layer has been formed.

The reader should appreciate that drawings showing methods, and the written descriptions thereof, should also be understood to illustrate machine-accessible media having recorded, encoded, or otherwise embodied therein instructions, functions, routines, control codes, firmware, software, or the like, which, when accessed, read, executed, loaded into, or otherwise utilized by a machine, will cause the machine to perform the illustrated methods. Such media may include, by way of illustration only and not limitation: magnetic, optical, magneto-optical, or other storage mechanisms, fixed or removable discs, drives, tapes, semiconductor memories, organic memories, CD-ROM, CD-R, CD-RW, DVD-ROM, DVD-R, DVD-RW, Zip, floppy, cassette, reel-to-reel, or the like. They may alternatively include down-the-wire, broadcast, or other delivery mechanisms such as Internet, local area network, wide area network, wireless, cellular, cable, laser, satellite, microwave, or other suitable carrier means, over which the instructions etc. may be delivered in the form of packets, serial data, parallel data, or other suitable format. The machine may include, by way of illustration only and not limitation: microprocessor, embedded controller, PLA, PAL, FPGA, ASIC, computer, smart card, networking equipment, or any other machine, apparatus, system, or the like which is adapted to perform functionality defined by such instructions or the like. Such drawings, written descriptions, and corresponding claims may variously be understood as representing the instructions etc. taken alone, the instructions etc. as organized in their particular packet/serial/parallel/etc. form, and/or the instructions etc. together with their storage or carrier media. The reader will further appreciate that such instructions etc. may be recorded or carried in compressed, encrypted, or otherwise encoded format without departing from the scope of this patent, even if the instructions etc. must be decrypted, decompressed, compiled, interpreted, or otherwise manipulated prior to their execution or other utilization by the machine.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. An apparatus comprising:
   a substrate;
   a set of first micro-mirrors coupled to the substrate;
   an insulative layer overlying the first set of micro-mirrors;
   a set of second micro-mirrors overlying the insulative layer.

2. The apparatus of claim 1 wherein the sets of first and second micro-mirrors are interspersed in a checkerboard pattern.

3. The apparatus of claim 1 wherein the micro-mirrors are substantially square.

4. The apparatus of claim 1 wherein the micro-mirrors are eight-sided, nearly square, with relieved corners.

5. The apparatus of claim 1 wherein the micro-mirrors are substantially hexagonal.

6. The apparatus of claim 1 wherein the micro-mirrors are arranged in a substantially hexagonal grid.

7. The apparatus of claim 1 wherein an adjacent first micro-mirror and second micro-mirror are laterally spaced apart by substantially only a thickness of the insulative layer.

8. The apparatus of claim 1 wherein the first and second micro-mirrors are made of metal.

9. The apparatus of claim 8 wherein the metal comprises aluminum.

10. The apparatus of claim 8 wherein the metal comprises silver.

11. The apparatus of claim 1 wherein the micro-mirrors are arranged in a regular, substantially rectangular grid.

12. The apparatus of claim 1 wherein the micro-mirrors are arranged in a substantially square grid.

13. The apparatus of claim 1 further comprising:
   a second insulative layer overlying the second set of micro-mirrors;
   a liquid crystal layer overlying the second insulative layer; and
   a transparent electrode layer overlying the liquid crystal layer.

14. A spatial light modulator comprising:
   an array of micro-mirrors, the array including,
      a first set of micro-mirrors, and
      a second set of micro-mirrors,
   wherein the first and second sets of micro-mirrors are interspersed with a spacing closer than practicable with lithography techniques.

15. The spatial light modulator of claim 14 wherein the spacing is such that less than 5% of light striking the array is lost between the micro-mirrors.

16. The spatial light modulator of claim 15 wherein the spacing is such that less than 1% of light striking the array is lost between the micro-mirrors.

17. The spatial light modulator of claim 15 wherein the spacing is such that less than ½% of light striking the array is lost between the micro-mirrors.

18. An article of manufacture comprising:
   a machine-accessible medium including data that, when accessed by a machine, cause the machine to fabricate the apparatus of claim 14.

19. The article of manufacture of claim 18 wherein the machine-accessible medium further includes data that cause the machine to fabricate the apparatus of claim 16.

20. The article of manufacture of claim 19 wherein the machine-accessible medium comprises a recording medium bearing the data.

21. The article of manufacture claim 19 wherein the machine-accessible medium comprises a carrier wave bearing the data.

22. A method of manufacturing a spatial light modulator on a substrate, the method comprising:
   fabricating a first set of micro-mirrors on the substrate; and subsequently
   fabricating a second set of micro-mirrors on the substrate and interspersed in the first set of micro-mirrors.

23. The method of claim 22 further comprising:
   interspersing the first and second sets of micro-mirrors in a substantially checkerboard pattern.

24. The method of claim 23 wherein fabricating the first set of micro-mirrors comprises:
   forming each of the first set of micro-mirrors with a substantially rectangular shape.

25. The method of claim 24 wherein fabricating the second set of micro-mirrors comprises:
   forming each of the second set of micro-mirrors with a substantially rectangular shape.

26. The method of claim 25 wherein the substantially rectangular shapes of the first and second micro-mirrors comprises a square.

27. The method of claim 26 wherein the square comprises an eight-sided shape with slightly relieved corners.

28. The method of claim 22 further comprising:
   interspersing the first and second sets of micro-mirrors in a substantially honeycomb pattern.

29. The method of claim 28 wherein fabricating the first set of micro-mirrors and fabricating the second set of micro-mirrors comprise:
   forming each of the respective set of micro-mirrors with a substantially hexagonal shape.

30. The method of claim 22 further comprising, between fabricating the first set of micro-mirrors and fabricating the second set of micro-mirrors:
   forming an insulative layer overlying the first set of micro-mirrors.

31. The method of claim 30 further comprising, between forming the insulative layer and fabricating the second set of micro-mirrors:
   forming holes through the insulative layer to enable the second set of micro-mirrors to be in electrical contact with corresponding conductive elements.

32. The method of claim 30 further comprising, after fabricating the second set of micro-mirrors:
   forming a second insulative layer overlying the second set of micro-mirrors.

33. The method of claim 32 further comprising:
   chemical mechanical polishing the second insulative layer.

34. The method of claim 32 further comprising, after forming the second antireflective layer:
   depositing a liquid crystal layer overlying the second antireflective layer; and
   depositing a conductive transparent layer overlaying the liquid crystal layer.

35. An article of manufacture comprising:
   a machine-accessible medium including data that, when accessed by a machine, cause the machine to perform the method of claim 22.

36. The article of manufacture of claim 35 wherein the machine-accessible medium further includes data that cause the machine to perform the method of claim 23.

37. The article of manufacture of claim 36 wherein the machine-accessible medium comprises a recording medium bearing the data.

38. The article of manufacture of claim 36 wherein the machine-accessible medium comprises a carrier wave bearing the data.

39. A product formed by a process comprising:

first fabricating a set of first micro-mirrors in electrical contact with a first set of interconnects in a substrate;

subsequently, fabricating a set of second micro-mirrors in electrical contact with a second set of interconnects in the substrate.

40. The product of claim 39 formed by the process further comprising, between the first fabricating and the subsequently fabricating:

depositing an insulative layer overlying the set of first micro-mirrors.

41. The product of claim 40 formed by the process wherein the depositing the insulative layer overlying the set of first micro-mirrors comprises depositing between 200 Å and 20,000 Å of insulative material.

42. The product of claim 40 formed by the process further comprising, after fabricating the set of second micro-mirrors:

depositing a layer of liquid crystal material overlying the first and second micro-mirrors; and depositing a transparent electrode layer.

* * * * *